Figure 5:
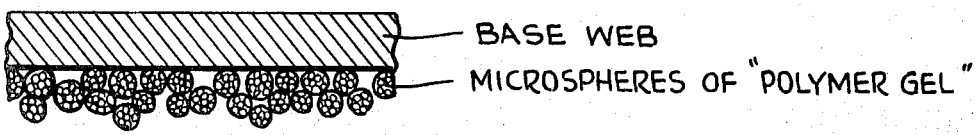

United States Patent [19]
Macaulay et al.

[11] 3,720,534
[45] March 13, 1973

[54] POLYMER GELS AND METHOD OF MAKING SAME

[75] Inventors: Norman Macaulay, Tonawanda; Henn Ruus, Niagara Falls, both of N.Y.

[73] Assignee: Moore Business Forms, Inc., Niagara Falls, N.Y.

[22] Filed: May 25, 1970

[21] Appl. No.: 41,685

Related U.S. Application Data

[63] Continuation of Ser. No. 798,257, Feb. 3, 1969, abandoned, which is a continuation of Ser. No. 341,055, Jan. 29, 1964, abandoned.

[52] U.S. Cl. ............117/36.2, 260/2.5 B, 260/2.5 R, 260/30.6 R, 260/31.2 R, 260/33.6 UA, 260/33.8 UA, 260/41 A, 260/41 R, 260/41 C, 260/86.1 R, 260/86.1 E, 260/89.5 A

[51] Int. Cl. .................................................B41c 1/06

[58] Field of Search ......260/2.5 B, 2.5 R, 41 C, 33.6; 117/36.2

[56] References Cited

UNITED STATES PATENTS

| | | | |
|---|---|---|---|
| 3,368,989 | 2/1968 | Wissinger et al. | 117/36.1 |
| 2,989,493 | 6/1961 | Clark et al. | 260/23 X |
| 3,255,127 | 6/1966 | Von Bonin | 260/2.5 B |
| 3,256,219 | 6/1966 | Will | 260/2.5 B |
| 2,800,077 | 7/1957 | Marrow | 260/2.5 B |
| 2,939,009 | 5/1960 | Tien | 260/2.5 B |
| 2,984,582 | 5/1961 | Newman | 260/2.5 B |
| 3,016,308 | 1/1960 | Macaulay | 260/2.5 B |
| 3,055,297 | 8/1962 | Leeds | 260/2.5 B |
| 3,141,407 | 7/1964 | Leeds | 260/2.5 B |

OTHER PUBLICATIONS

Celanese Chemical Co. "Acrylates" copyright 1959, pgs. 24 and 25.
"Vinyl and Related Polymers" Schildknecht copyright 1952 pgs. 208–211 and 220–221.

*Primary Examiner*—Murray Tillman
*Assistant Examiner*—Morton Foelak
*Attorney*—William J. Daniel

[57] ABSTRACT

A solid composition exuding oil under pressure and constituted essentially of a solid, generally rigid, lattice of molecules of an acrylate polymer cross-linked with sufficient cross-linking agent up to a minor amount of yield a solid water-insoluble polymer, said lattice having non-volatile, non-drying oil occluded in situ uniformly therethrough, the oil being present in the amount of about 35–80 percent by weight of the solid polymer, the oil being a solvent for the monomer and cross-linking agent and a non-solvent for the solid polymer but exerting at least a partial swelling or plasticizing action on the polymer. The composition may be formed as structures varying from shaped three-dimensional masses to discrete finely-divided particles. The compositions are prepared by vorming an intimate admixture of the monomer and cross-linking agent in the oil and polymerizing the same in situ. Finely-divided particles are obtained by the further steps of dispersing the admixture of monomer oil solution in an aqueous medium and effecting the polymerization while maintaining the dispersion.

5 Claims, 7 Drawing Figures

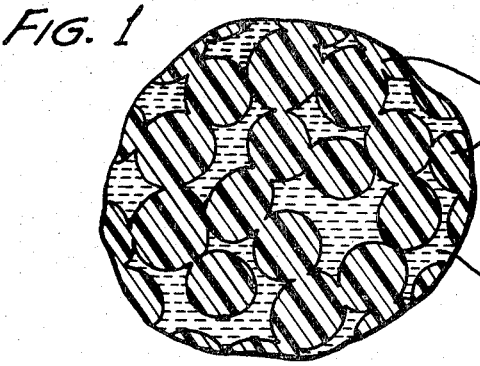

Fig. 1 — POLYMER PARTICLES SLIGHTLY SWOLLEN AND FUSED TOGETHER AT POINTS OF CONTACT.
— EXCESS LIQUID

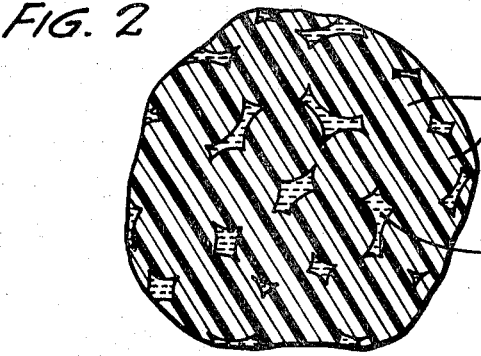

Fig. 2 — POLYMER PARTICLES MODERATELY SWOLLEN AND FUSED TOGETHER.
— EXCESS LIQUID

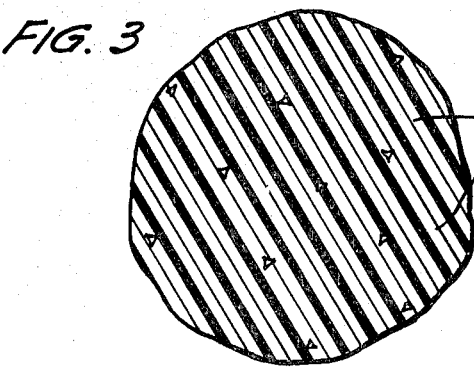

Fig. 3 — POLYMER PARTICLES ALMOST COMPLETELY SWOLLEN AND FUSED TO GIVE A JELLY.

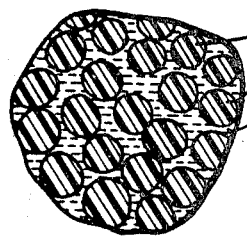

Fig. 4 — POLYMER PARTICLES
— INCOMPATIBLE LIQUID

INVENTORS,
NORMAN MACAULAY
HENN RUUS

BY Watson, Cole, Grindle & Watson
ATTORNEYS

BASE WEB
MICROSPHERES OF "POLYMER GEL"

BASE WEB
MICROSPHERES OF POLYMER GEL IMBEDDED IN BINDER COATING.

BASE WEB
MICROSPHERES OF POLYMER GEL WITHIN ENCAPSULATING SHELL.

INVENTORS,
NORMAN MACAULAY
HENN RUUS

BY Watson, Cole, Grindle & Watson
ATTORNEYS

POLYMER GELS AND METHOD OF MAKING SAME

This application is a continuation of Ser. No. 798,257 filed Feb. 3, 1969, now abandoned, which is in turn a continuation of Ser. No. 341,055 filed Jan. 29, 1964, now abandoned.

This invention relates to novel gel structures, transfer papers comprising said gel structures, and to the method of manufacturing such gels. More particularly, the invention embraces polymer gels in intimate contact with an oil. The oil, which is a solvent for the monomer of said polymer, as well as a non-solvent plasticizing or swelling agent for the polymer, is present during the formation of the polymer gel. The novel gels will exude the oil repeatedly, upon repeated application of pressure.

In the prior art, particularly since the advent of waxless transfer coatings based on synthetic resins as a substitute for the more conventional wax base, numerous processes for making fluid containing polymers have been described which are useful in the art of manufacturing transfer coatings. Thus, fluid containing capsules have been suggested which are prepared by dispersing a solution of monomer and oil in a non-compatible liquid to form droplets, and thereafter, polymerizing the monomer in the dispersed droplets to form a solid polymer capsule wall around each of the monomer droplets. The capsules which are obtained in discrete form, are supplied to a suitable carrier for use as transfer papers. Upon application of pressure to the papers, the capsule wall ruptures releasing the contained fluid. As is apparent, since all of the fluid is released at one time when the encapsulating shell is ruptured, repeated application transfer coatings and the like cannot be constructed employing such capsules.

Therefore, transfer coating structures have been suggested whereby a marking fluid and monomeric liquid are polymerized in situ on a carrier sheet. The resultant structure consists of a continuous polymer coating with liquid occluded in pores or channels within the coating. The marking fluid is exuded from the coating upon application of pressure. This type of coating is essentially similar to the numerous solvent type waxless coatings wherein a solvent of polymer, non-volatile, non-drying fluid and marking material is applied to a carrier and the solvent allowed to evaporate, forming a continuous coating having a marking material contained therein. The coating, however, being continuous, is susceptible to curling and cracking unless extreme care is taken to obtain a composition having a high degree of flexibility upon drying. However, when sufficient flexibility is obtained, the coatings very often are too soft for convenient handling. Moreover, the aforesaid method of production of transfer paper is relatively slow and therefore not economical.

Accordingly, it is an object of the present invention to provide a polymer gel, in microsponge form, containing an oil which is capable of being exuded repeatedly from said gel upon repeated application of pressure.

It is another object of this invention to provide a carrier material having a coating of discreet particles of the polymer gel on at least one surface thereof, said coating being capable of repeated exudation of an oil upon application of pressure, with the particles of polymer gel adhering to the carrier and in contiguous relation to each other, but not forming a continuous film of polymer.

It is another object of this invention to provide a pressure sensitive transfer paper capable of repeated use comprising a carrier web containing a coating of discrete particles of the polymer gel in intimate contact with a marking oil.

It is still another object of this invention to provide a method of preparing a polymer gel in intimate contact with an oil which gel is capable of exuding said oil repeatedly upon application of pressure.

These and other objects of the instant invention will become more fully apparent from the following detailed description, with particular emphasis being placed upon the examples and drawing.

The polymer gels according to the present invention, comprise a coherent mass of submicroscopic polymer particles which are partially, or completely swollen by a compatible oil. The polymer particles are fused together at points of contact, and the interstices between the particles filled with oil. The oil retained in the interstices of the polymer particles can be an oil which is compatible with the polymer, or an oil which is substantially incompatible. In the latter case, however, sufficient compatible oil must also be present to cause swelling of the polymer. When pressure is applied to the polymer gel, oil is slowly released. The polymer gels are exceptionally well suited for use as pressure sensitive transfer coatings. However, their use is not restricted thereto, but can be used in the preparation of medicinal pads of the band aid type containing a suitable antiseptic, analgesic, or the like; as a marking crayon or any application where it is desirable or necessary to have a slow release of an oil by mere exertion of pressure.

The gels of the invention can be made by known methods, such as bulk, solvent, or emulsion polymerization techniques. However, the oil which is to be carried in the polymer must be a solvent for the monomer of the polymer and at least partially compatible with but not a solvent for the polymer. It is theorized that the fluid is retained within the cell structure by strong capillary forces. When pressure is applied to the gel, distortion of the lattice occurs and oil is forced out. The polymer mass, being swollen, is somewhat elastic and will regain its original form when the pressure is removed. Thus, the gel is capable of giving repeated exudations of oil under repeated application of pressure to the mass.

Figure 6:
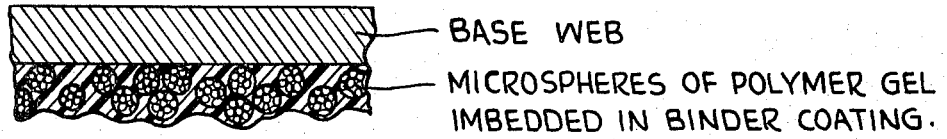
Figure 7:
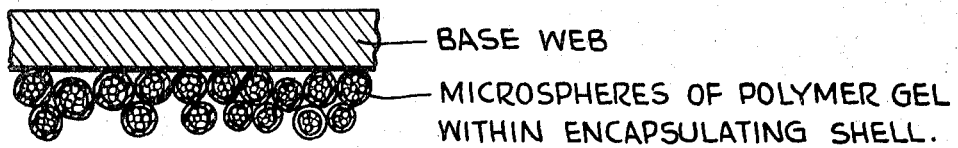

Depending upon the degree of compatibility of the oil with the polymer particles, and the amount of oil incorporated in the gel, variation in the polymer structure is obtained. Thus, FIGS. 1–4 of the drawing illustrate portions of polymer gels, whereas FIGS. 5–7 are diagrammatic illustrations of transfer coatings made according to the present invention.

More specifically, FIG. 1 illustrates polymer particles sufficiently swollen or plasticized to fuse together at points of contact, thereby forming a coherent structure. The oil held in the interstices is functionally inert with respect to the polymer, being either completely incompatible or in excess of the amount which the polymer particles can absorb. The cohesion of the particles depends largely on the plasticizing effect of the particular oil.

FIG. 2 shows an oil of good compatibility, in which greater fusion of the particles has occurred.

FIG. 3 illustrates an oil of extreme compatibility where almost all of the oil is absorbed by the polymer to form a swollen gel. With very high oil content, a jelly is formed. It is noted that even the compatible oil should not act as true solvents for the polymer.

FIG. 4 demonstrates agglomerated, unswollen polymer particles having an incompatible oil in the interstices. Since the polymer is unswollen, with no fusion of the particles, the polymer particles are held together only very weakly, probably by surface tension of the interstitial oil. When a volatile oil is used and allowed to evaporate, the remaining polymer crumbles to a very fine powder of the minute polymer particles. Because of their structural weakness, compositions of the type of FIG. 4 are not operable according to the instant invention. The latter structure demonstrates very vividly the need for at least partial compatibility of the oil with the polymer.

FIGS. 5-7 will be described more fully hereinafter.

The monomers which can be employed in preparing the polymer gels of the present invention, include any of the acrylate type monomers, either singly or in admixture, including cyclohexyl methacrylate, polyethylene glycol methacrylate, butyl methacrylate, hexyl methacrylate, isobutyl acrylate, isobutyl methacrylate, 1,3 butylenedimethacrylate, and trimethylol propane trimethacrylate, among others. As some of the examples show, a small amount of cross-linking agent for the acrylate monomer may be added to insure that the resultant polymer is sufficiently solid and sufficiently insoluble in water, especially where the polymerization is of the emulsion type. Examples of suitable cross-linking agents include divinylbenzene and allyl methacrylate. It is only necessary that the oil to be contained within the polymer gel is a solvent for the monomer selected, and the cross-linking agent, if any, and at least a partially swelling or plasticizing agent but not a solvent for the polymer gel.

The oil which is to be retained within the gel structure, can be selected from a wide variety of known oils. Again, the only criteria being the relationship of the oil with the monomer and with the polymer gel as indicated above. Thus, it can be desirable to employ an admixture of oils, at least one of which exerts a storage swelling action upon the polymer particles than the other, to obtain a structure substantially as shown in FIG. 2 with the stronger swelling oil being absorbed by the polymer particles, with resultant swelling of said polymer particles, and the weaker swelling oil being contained within the interstices of the polymer gel. In this manner, upon application of pressure to the polymer, exudation of the weaker swelling oil, as well as some exudation of the other oil, will occur. Operable materials include normal heptane, toluene, petroleum distillates, dioctyl phthalate, diamyl napthalene, diethyl phthalate, dibutyl phthalate, dioctyl adipate, dibutyl sebacate, dibutyl maleate, tributyl phosphate, butyl stearate, methyl phthalyl ethyl glycolate, butyl benzyl phthalate, and chlorinated biphenyl, diamylbenzene, mineral spirits, V.M. & P. naphtha, etc. The term "oil" is used hereto to designate these and similar materials. Additionally, analgesic or medicinal materials, dyes, pigments, etc. can be incorporated, depending upon the resultant use of the polymer gel. The selection of a proper balancing of the materials is within the ability of one skilled in the art having the present teaching as a guide.

The relative percentage of oil to polymer particle can vary over a relatively broad range depending to a substantial extent upon the oil to be incorporated in the polymer gel, and upon the polymer particles. Thus, it has been found that compositions containing up to 92 percent fluid materials can be prepared using an acrylate type polymer and a highly plasticizing material therefor, such as the phthalates. The resultant composition is substantially jelly-like in structure. Normally, such materials have a tendency to bleed and, therefore, are not suitable for most uses. However, where it is desired to have a relatively rapid release of the fluid material, such as in a medicinal band aid, such structures can be desirable. Moreover, the addition of fillers to provide rigidity to the structure will permit the addition of larger percentages of oil. Normally, however, the oil will range from about 35 to 80 percent by weight of the oil/monomer mixture with the optimum range being about 60 to 80 percent. The lower limit again depends upon the materials used with the limiting criteria being the extent of swelling of the polymer structure. It is possible to make polymer gels which exude the oil having as little as 10 percent, on a weight basis, of the oil to the oil/monomer mixture.

The conditions of polymerization are not critical but vary according to the monomer and catalyst used. The standard techniques of bulk, solvent, or emulsion polymerization can be employed. However, generally, polymerization is brought about by heating to a temperature below the boiling point of the monomer and such that the heat of reaction when polymerization occurs is held within controllable limits. Polymerization can also occur at lower temperatures, but at a slower rate. The minimum temperature required is the temperature of activation of the catalyst. Polymerization can also be effected by ultraviolet irradiation.

The micro-spheres or particles of the gel will normally have diameters of from about 0.1 to 20 microns with the preferred range being in the order of about 5 to 10 microns. The polymer gels are obtained in what would appear to be a continuous polymer mass; as aqueous or solvent suspension of the gel particles or as a free flowing dried powder obtained by spray drying aqueous or solvent suspensions of the polymer particles.

In most cases, transfer papers, according to the instant invention, are prepared by coating a carrier sheet with an aqueous or solvent suspension of gelled particles by conventional means and drying. Thus, referring to the drawing, FIG. 5 illustrates a base web having micro-spheres of polymer gel adhering to the web and in intimate contact with one another. Thus, while the carrier base is completely covered with the polymer gel, a continuous polymer layer is not obtained. Therefore, the coating is not subject to cracking and/or shrinking with resultant curling of the transfer paper. Further, in the preparation of transfer papers, using the polymer gels of the instant invention, it can be desirable to admix a film forming protective colloid in the aqueous or solvent suspension of gel particles, which colloid will act as a binder. The binder will confer improved adhesion, bleed resistance, etc. Alternatively, the aqueous or solvent suspension with or without additives, can be dried to powder form by spraying drying. In this state the gel powder may be applied to the base carrier in a manner identical to that used for applying any pigment, provided that the vehicle for the gel powder has no harmful effect on the gel. FIG. 6 of the drawing illustrates a carrier web having a micro-sphere of polymer gel embedded in a binder coating. As is apparent, the adhesion of the coating to the base web is more uniform in comparison to the coating of FIG. 5 where a binder material is not employed.

As an additional embodiment, it is possible to enclose the micro-sponge gel particles in an encapsulating shell by known means, and applying the resultant capsules to a carrier base. This expediency is particularly well suited in instances where the polymer gel may bleed or have migratory tendencies. FIG. 7 illustrates a base web having a coating of micro-spheres of polymer gel within an encapsulating shell applied from a solvent suspension of said capsules.

In order that those skilled in the art may better understand how to practice the present invention, the following examples are set forth. These examples are presented by way of illustration and not by way of limitation, since there are many forms of the invention other than those specifically embodied. In the examples, parts are by weight unless specifically indicated otherwise.

EXAMPLE 1

Sixteen parts triphenylmethane dye, 80 parts mineral oil, 64 parts 1,3 butylenedimethacrylate and 0.4 parts azodiiso-butyronitrile were admixed to form a solution. The solution was emulsified into 240 parts of water containing 16 parts gum arabic, 0.4 parts tetrasodium pryophosphate, 0.8 parts sodium hypophosphite and 16 drops of monoethanolamine. The emulsion was heated to boiling and, after polymerization had taken place, i.e., approximately 5 minutes, kept at 90° to 95° C. for 5 additional minutes. Microscopic spheres of polymer gel were formed.

EXAMPLE 2

14.4 parts butylbenzylphthalate were dissolved in 9.6 parts of 1,3 butylenedimethacrylate containing 0.05 parts of azodiisobutyronitrile. The solution was placed in a test tube and the test tube placed in a boiling water bath. Complete polymerization occurred rapidly, i.e., 5 minutes, to give a rigid mass of polymer gel in rod form. When pressure was applied to the product, a mark was obtained.

EXAMPLE 3

A solution consisting of 17 parts methylmethacrylate, 33 parts mineral oil, and 0.1 parts azodiisobutyronitrile was emulsified into 200 parts water containing 0.3 parts polyvinyl alcohol, a trace of tetrasodium pyrophosphate, and 3.0 parts colloidal silica containing 99.0 – 99.7 percent silica of 0.015–0.020 microns particle diameter and having a specific gravity of 2.1. The temperature of the emulsion was raised to 77°–78° C. and held for approximately 15 minutes until polymerization was complete. The dispersion was filtered off and examined under the microscope. Under applied pressure the individual particles exuded mineral oil.

EXAMPLE 4

A mixture consisting of 25 parts methyl methacrylate, 15 parts alkali blue pigment in 60 parts mineral oil, 1.5 parts lecithin and 0.1 parts azodiisobutyronitrile was emulsified into 300 parts water containing 12 parts polyvinyl alcohol, 0.1 parts tetrasodium pyrophosphate and 3 parts talc and the emulsion heated to 80°–81° C. for about 20 minutes until polymerization was complete. A 0.0005 inch wet film of the dispersion was pulled down by means of a doctor blade onto 10 pound continuous bond and the sheet dried. Under applied pressure, the pigmented marking fluid exuded to give a mark on an adjacent copy receiving sheet.

EXAMPLE 5

1.25 parts divinylbenzene, 25 parts methyl methacrylate, 75 parts mineral oil, 3 parts bis(p,p'-dimethylaminophenyl) morpholinyl methane, and 0.1 part azodiisobutyronitrile was emulsified into 300 parts water containing 4.5 parts polyvinyl alcohol, 0.1 part tetrasodium pyrophosphate, and 1 part sodium hypophosphite and the emulsion heated to 80° C. under a nitrogen atmosphere until polymerization took place. A fine dispersion of micro-spheres containing marking fluid was obtained, with the average particle size of the spheres being about 5 microns in diameter. A film of the dispersion of 0.0005 inch wet film thickness, when dried on 10 pound continuous bond, gave a blue mark under pressure on an adjacent copy receiving sheet.

EXAMPLE 6

A solution consisting of 25 parts methyl methacrylate, 1.25 parts n-butylacrylate, 0.1 part azodiisobutyronitrile and 75 parts mineral oil was emulsified in 300 parts water containing 4.5 parts polyvinyl alcohol, 0.1 part tetrasodium pyrophosphate, and 1 part sodium hypophosphite. On heating to 80° C. for 20 minutes, a dispersion of copolymerized oil containing micro-spheres was obtained. Oil was exuded on application of pressure.

EXAMPLE 7

A solution consisting of 33 parts methyl methacrylate, 0.5 parts allyl-methacrylate, 67 parts mineral oil, 2 parts bis(p,p'-dimethylaminophenyl) morpholinyl methane, 0.1 part azodiisobutyronitrile and 0.1 part monoethanolamine was emulsified into 300 parts water containing 4.5 parts polyvinyl alcohol, 0.01 part tetrasodium pyrophosphate, and 1 part sodium hypophosphite. The emulsion was blanketed in nitrogen and the reaction charge stirred while being exposed to ultraviolet light. The temperature of the reaction mixture rose from 35° to 52° C. in approximately 20 minutes. Thereafter, the charge was heated to 97° C. and held an additional 10 minutes. The polymerization was complete within about 30 minutes. A portion of the mixture was coated on 10 pound continuous bond by applying a wet film thickness of 0.0005 inch by means of a doctor blade and drying. The coated sheet, upon application of pressure, gave an intense blue mark on an acidified copy receiving sheet.

EXAMPLE 8

A solution consisting of 60 parts mineral oil, 38 parts methylmethacrylate, 2 parts allylmethacrylate, 2.5 parts bis(p,p'-dimethylaminophenyl) morpholinyl methane and 0.1 part azodiisobutyronitrile was emulsified into 300 parts water containing 6 parts polyvinyl alcohol, 0.1 part monoethanolamine, 0.1 part tetrasodium pyrophosphate and 1 part sodium hypophosphite. The reaction charge was heated to 80° C. and held at approximately this temperature for 30 minutes to obtain complete polymerization. One-hundred parts of the material was boiled with 0.5 part potassium persulfate, and thereafter admixed with 100 parts of a 50 percent by weight dispersion of china clay in water and 1.5 parts zinc chloride. 0.0005 inch wet films were pulled down onto 10 pound continuous bond by means of a doctor blade and dried. A white pull down was obtained which produced a mark on an acidified copy receiving sheet, when pressure was applied by an inkless stylus.

EXAMPLE 9

A paper coating mixture was prepared by dispersing 36 parts attapulgite clay having an average particle size of 2.9 micron, a pH in the range of 7.5 – 9.0 and a specific gravity of 2.45, 44 parts alpha alumina trihydrates in pure form, having a particle size of less than 1 micron and a refracted index of 1.57, 24 parts ethyl cellulose and 8 parts anhydrous zinc chloride in 250 parts methanol. The dispersion was coated on the felt side of a 10 pound continuous bond paper to a dry weight of 2.8 pounds by roll applicator with scrape rod, followed by evaporation of the solvent. On the other side of the sheet was coated a 15 percent by weight solution of ethyl cellulose in methanol and the solvent evaporated to give a dry coating weight of 0.5 pounds.

A solution consisting of 1,120 parts 1,3 butylene-dimethacrylate, 3.5 parts azodiisobutyronitrile, and 98 parts bis(p,p'-dimethylaminophenyl) morpholinyl methane in 1,680 parts mineral oil was emulsified into 4,200 parts water containing 280 parts gum arabic and 17.5 parts monoethanolamine. The emulsion was heated to 95° C. until the monomer polymerized. 1.5 parts potassium persulfate and 35 parts of sodium carbonate were added. To 10 parts of the polymer gel, micro-sphere dispersion were added 2.16 parts paper coating binder consisting of an acrylic copolymer latex of 46 percent solids, a viscosity of 300 to 400 pH between 7 and 7.5 and having a particle size average of 0.12 microns, and the mixture coated on the ethyl-cellulose coated side of the paper web, previously prepared above, and the coating dried. Several sheets of this prepared paper were assembled into a set such that each polymer gel coating faced a clay developing surface. On imprinting the assembly, good blue copies of the original imprint were obtained throughout the assembly.

In the above example, other dyes and pigments can be employed including carbon blacks, iron blues, phthalocyanines, cadmium reds, ultramarine blues, azo dyes, diazonium salts, indigoid dyes, phthalocyanine dyes, anthraquinone dyes, acridine dyes, azine dyes, oxazine dyes, thiazine dyes, thioindigoid dyes, etc. However, if a solid coloring matter is employed, the particles must be small enough to flow through the interstices between the polymer particles in the gel.

Further, although it is not necessary to employ fillers in the presently described structures, fillers do perform useful functions such as helping to hold the gels together. Fillers which are finely divided, including organic and inorganic materials, such as china clay, mica, burnt umber, talc, titanox, barium sulphate, diatomaceous earth, and the like, can be employed.

Although the foregoing examples are directed primarily to the preparation of transfer paper, it will be appreciated that the invention is not restricted thereto. The invention can be used in the preparation of medicinal pads, or virtually any product where it is necessary to have a fluid exude slowly upon the application of pressure. Other embodiments of the invention will be apparent to one skilled in the art, having the present specification as a guide, which will fall within the scope and spirit of the invention and appended claims.

We claim:

1. A solid composition having a predetermined configuration varying from shaped three-dimensional masses to discrete finely-divided particles and exuding a non-volatile, non-drying oil when pressure is applied thereto, said composition consisting essentially of (a) about 20–65 percent by weight of a polymer of an acrylate monomer with up to a minor amount of a cross-linking agent for said monomer and sufficient to give a solid water-insoluble polymer, and (b) from about 35 percent to about 80 percent by weight of a non-volatile, non-drying oil which is a solvent for said acrylate monomer and such cross-linking agent and at least a partial swelling or plasticizing agent but non-solvent for said solid polymer, said solid composition being constituted of a solid coherent lattice structure of said polymer molecules polymerized in said predetermined configuration with said oil occluded in situ uniformly throughout said lattice and having its external surfaces free of visible oil except when subjected to pressure, said oil being sufficiently compatible with said polymer that it is occluded in substantial entirety within said polymer lattice structure, said monomer being oil-soluble and selected from the group consisting of acrylic acid, methacrylic acid, and the alkyl, cycloalkyl and hydro-alkyl esters thereof and said cross-linking agent having at least two terminal ethylenically unsaturated groups, and selected from the group consisting of allylmethacrylate and divinylbenzene, and said oil being selected from the group consisting of monohydric alcohol esters of carboxylic acids, monohydric alcohol esters of phosphoric acid, aliphatic hydrocarbons, aromatic hydrocarbons, and chlorinated aromatic hydrocarbons.

2. The solid composition of claim 1 wherein said oil contains coloring material producing a visible image when impressed upon a copy sheet.

3. The solid composition of claim 2 in the form of discrete solid particles distributed in contiguous relationship in a layer over one surface of a record sheet, whereby when said record sheet is superimposed upon a copy sheet and subjected to imagewise pressure, said oil containing coloring material is exuded from said particle layer onto said copy sheet to form a visible image thereon.

4. The method of preparing the solid composition of claim 1 comprising forming an intimate admixture consisting essentially of (a) about 20–65 percent by weight of an acrylate monomer; (b) up to a minor amount of a cross-linking agent for said monomer and sufficient to produce upon polymerization a water-in-soluble solid polymer, and (c) from about 35–80 percent by weight of a non-volatile, non-drying oil in which said monomer and such cross-linking agent are soluble, said oil being at least a partial swelling or plasticizing agent but non-solvent for said solid polymer; forming said admixture into a predetermined configuration; and while the admixture is in said configuration, heating the same to polymerization temperature until said monomer and such cross-linking agent are substantially completely polymerized, thereby forming a solid coherent lattice structure of polymer molecules having said predetermined configuration with said oil in substantial entirely occluded in situ therein, said oil being sufficiently compatible that it is occluded in substantial entirely within said polymer lattice structure, said monomer being oil-soluble and selected from the group consisting of acrylic acid, methacrylic acid, and the alkyl, cycloalkyl and hydroxyalkyl esters thereof, and said cross-linking agent having at least two terminal ethylenically unsaturated groups and being selected from the group consisting of allylmethacrylate and divinylbenzene, and said oil being selected from the group consisting of monohydric alcohol esters of carboxylic acids, monohydric alcohol esters of phosphoric acid, aliphatic hydrocarbons, aromatic hydrocarbons, and chlorinated aromatic hydrocarbons.

5. The method of claim 4 for preparing finely-divided particles of said solid composition having a diameter up to about 20 microns which includes the steps of dispersing said admixture in an aqueous medium with which said oil is immiscible, effecting the polymerization of said monomer and said cross-linking agent while said admixture is so dispersed to produce finely divided particles of said solid coherent polymer lattice structure with said oil occluded in situ therein, and recovering the resultant finely-divided particles of said composition.

* * * * *